Patented June 15, 1943

2,321,963

UNITED STATES PATENT OFFICE 2,321,963

QUATERNARY AMMONIUM COMPOUNDS

Werner Zerweck and Otto Trösken, Frankfort-on-the-Main-Fechenheim, Germany; assignors to General Aniline & Film Corporation, New York, N. Y., a corporation of Delaware No Drawing. Application August 6, 1940, Serial No. 351,644. In Germany August 19, 1939

4 Claims. (Cl. 260—45)

The present invention relates to new quaternary ammonium compounds. More particularly it relates to quaternary ammonium compounds prepared by acting with alkylating agents on such condensation products of phenolic compounds with aldehydes as are obtained by condensing one mole of a phenol, naphthol or hydrogenated phenol with at least three moles of an aldehyde in the presence of considerable amounts of ammonium salts which can also be replaced, in part, by amines.

The aforesaid initial materials employed for the manufacture of the present new quaternary ammonium compounds represent a special group within the well-known class of condensation products of phenols with aldehydes. This special group of compounds the structure of which has, hitherto, not been found out and which is distinguished by remarkable new properties, has been described in the German Patent No. 686,988. Owing to the fact that the condensation of at least three moles of an aldehyde with one mole of a phenol is performed in the presence of considerable amounts of ammonium salts which, in part, can also be replaced by amines, the condensation products thus obtained exhibit the character of basic compounds. They are soluble in dilute acids and possess the property of precipitating from dilute aqueous solutions such organic dyestuffs as contain acid groups, furthermore tanning matters and waste sulfite liquors.

In carrying out the present invention, the above described initial materials are treated with alkylating agents according to known methods whereby valuable new quaternary ammonium compounds are obtained which can be employed for various technical purposes. Inter alia, they are distinguished by the valuable property of increasing considerably the fastness to washing of dyeings obtained on cellulose materials by means of substantive dyestuffs, when such dyeings are after-treated with an aqueous solution of one of the new quaternary ammonium compounds.

In order to further illustrate the present invention, the following examples are given, the parts being by weight and all temperatures in centigrade degrees.

Example 1

10 parts of phenol, 50 parts of an aqueous formaldehyde solution of 40% formaldehyde contents and 15 parts of ammonium sulfate are heated to boiling for about three hours. After cooling a clear yellowish colored acid liquor is obtained which remains clear when water or acids are added.

10 parts of the condensation product thus obtained are dissolved in 60 parts of water. Into this solution 40 parts of dimethylsulfate are slowly dropped in while stirring at a temperature of 20 to 25°. In the meantime the reaction mixture is kept in a basic state by the addition of sodium carbonate. After the dimethyl sulfate has been dropped in, the mixture is further stirred for some hours at room temperature. Hereafter it is filtered. By evaporating the aqueous solution to dryness or by adding concentrated alkali solutions the quaternary ammonium compounds formed are isolated as a yellowish colored resin-like mass.

By aftertreating dyeings obtained on cellulose materials by means of substantive dyestuffs for about 30 minutes with an aqueous solution containing 0.2 percent of the above alkylating product at a temperature of about 30°, a considerable improvement of the fastness to washing of the aftertreated dyeings is obtained.

Example 2

10 parts of phenol, 10 parts of ammonium sulfate, 5 parts of iso-heptylamine and 70 parts of an aqueous formaldehyde solution of 40 percent formaldehyde contents are heated to boiling for about 3 hours while stirring in an apparatus provided with a reflux condenser.

10 parts of the condensation product thus obtained are dissolved in about 60 parts of water. 40 parts of dimethyl sulfate are dropped into this solution at about 20 to 25°, with the simultaneous addition of sodium carbonate in order to keep the solution basic throughout the addition of the dimethyl sulfate. Hereafter the mixture is stirred for some hours at room temperature. The alkylating product obtained is isolated as a yellowish colored resin-like mass by the addition of concentrated alkali lye or by evaporating the solution until dry.

For the purpose of aftertreating dyeings the reaction solution can be employed without preceding isolation of the quaternary ammonium compound. A considerable improvement of the fastness to light is obtained by such an aftertreatment of dyeings produced on cellulose materials by means of substantive dyestuffs.

Example 3

10 parts of phenol, 5 parts of butylamine, 10 parts of ammonium sulfate and 70 parts of an aqueous formaldehyde solution of 40 percent formaldehyde contents are heated to boiling for some hours while stirring under a reflux condenser.

10 parts of the condensation product thus obtained are dissolved in about 60 parts of water and then alkylated by adding 40 parts of dimethyl sulfate at about 20 to 25° with the simultaneous addition of 20 parts of sodium carbonate. After stirring at room temperature for about 20 hours, an alkylating product is obtained which can be isolated in the same manner as described in the foregoing examples. It can also be employed without preceding isolation for the aftertreatment of dyeings whereby a considerable improvement of the fastness to washing is obtained.

*Example 4*

10 parts of phenol, 10 parts of dimethyl-aniline, 10 parts of ammonium sulfate and 80 parts of an aqueous formaldehyde solution of 40 percent formaldehyde contents are heated to boiling for some hours while stirring under a reflux condenser.

10 parts of the condensation product thus obtained are dissolved in about 60 parts of water and treated with 40 parts of dimethylsulafte as described in the foregoing examples. The reaction mixture obtained can also be employed as such for the improvement of the fastness properties of dyeings produced on cellulose materials by means of substantive dyestuffs.

We claim:

1. Quaternary ammonium compounds prepared by peralkylating condensation products obtained by condensing one mole of a phenolic compound selected from the group consisting of phenols and naphthols with at least three moles of an aliphatic aldehyde in the presence of a member selected from the group consisting of ammonium salts and mixtures of ammonium salts with amines to convert only the nitrogen atoms in said condensation products and those to quaternary ammonium salt groups which quaternary ammonium compounds are yellowish colored resin-like masses, soluble in water and characterized by the property of considerably increasing the fastness to washing of dyeings produced on cellulose materials by means of substantive dyestuffs.

2. The compounds as defined in claim 1 wherein the peralkylizing is effected by means of dimethyl sulfate.

3. Quaternary ammonium compounds as defined in claim 1 wherein the peralkylizing is effected with dimethyl sulfate at a temperature of 20 to 25° C.

4. Quaternary ammonium compounds as defined in claim 1 wherein the peralkylizing is effected with dimethyl sulfate at 20 to 25° C. in an aqueous solution of the condensation product to which sodium carbonate has been added to insure that the solution will remain alkaline.

WERNER ZERWECK.
OTTO TRÖSKEN.